United States Patent

[11] 3,558,860

[72] Inventors John Bauldreay
Royston;
David Gordon Boulter, Gamlingay near Sandy; Frederick Thomas Chiles, Biggleswade, England
[21] Appl. No. 694,448
[22] Filed Dec. 29, 1967
[45] Patented Jan. 26, 1971
[73] Assignee International Computers and Tabulators Limited
Putney, London,
a British Company
[32] Priority Jan. 6, 1967
[33] Great Britain
[31] 908/67

[54] DOCUMENT FEEDING SYSTEMS
17 Claims, 3 Drawing Figs.

[52] U.S. Cl. .......... 235/61.11, 235/92; 178/42
[51] Int. Cl. .......... G06k 13/06
[50] Field of Search .......... 178/42; - 235/92(34,59), 61.11, 61.114, 61.115

[56] References Cited

UNITED STATES PATENTS

| | | | |
|---|---|---|---|
| 2,603,123 | 7/1952 | Loukomsky et al. .......... | 235/92INT |
| 3,271,024 | 9/1966 | May .......... | 235/61.11 |
| 3,272,969 | 9/1966 | Cutaia .......... | 235/61.11 |
| 3,341,691 | 9/1967 | Modersohn et al. .......... | 235/61.115 |

*Primary Examiner*—Thomas A. Robinson
*Attorney* – Hane and Baxley

ABSTRACT: In a document feeding device, the passage of each document past a fixed point produces a signal which is combined with timing signals. The resultant output signal indicates the timing of that document relative to a number of possible document timing increments. The signals for each timing increment are summed on a weighted basis to provide an indication of the distribution of document timing over a number of documents. The summed signals may be used to operate a visual display to facilitate manual adjustment of the document feed, or they may be used to control a servosystem which provides automatic adjustment.

INVENTORS
John Bauldreay
David Gordon Boulter
Frederick Thomas Chiles
BY Harris and Bayley
ATTORNEYS INVENTORS
JOHN BAULDREAY
DAVID GORDON BOULTER
FREDERICK THOMAS CHILES
BY Hane and Baxley
ATTORNEYS INVENTORS
JOHN BAULDREAY
DAVID GORDON BOULTER
FREDERICK THOMAS CHILES
BY
ATTORNEYS

DOCUMENT FEEDING SYSTEMS

BACKGROUND OF THE INVENTION

The ability of electronic data processing systems to handle a great quantity of data has increased the problems of the preparation of the necessary input data. This has led to a requirement for using original documents as direct input media for data processing systems, thus eliminating the transcription of the data from the original documents on to the conventional record media, such as punched cards, or punched paper tape. The data may be recorded on the original documents in any of a variety of ways, such as magnetic ink characters, optically readable characters or bar codes, etc.

The dimensions, stiffness, and other characteristics of punched cards and tapes have been standardized to a high degree, so that a punched card feeding system can be expected to operate satisfactorily with no adjustment other than that which takes place in the course of normal maintenance of the machine. On the other hand, the dimensional, and other characteristics of original documents vary widely. For example, a feed for original documents, such as checks, repayment slips, etc., may have to allow for a range of document widths from 3 inches to 8½ inches and a range of document lengths from 5½ inches to 13 inches. In addition, the surface of different documents may differ considerably in smoothness, so that the frictional resistance to feeding are different. Despite these differences in characteristics, accurate timing of the feeding of each document must be maintained to allow correct reading of the data recorded on the document and/or the correct selection of the document if it is being sorted, or otherwise physically segregated.

It is clearly an extremely difficult task to design a feed which will maintain accurate timing of documents having widely differing characteristics. The requirements can be made less stringent by arranging the documents in batches, the characteristics of the documents in any one batch being nominally the same within a given tolerance, and adjusting the feed to an optimum condition for each batch. It is desirable for obvious operational reasons that it should be possible for the machine operator to carry out the adjustments which may be required for each batch of documents.

SUMMARY

The present invention provides document feeding apparatus including means operative to feed a succession of documents one by one along a feeding path; sensing means operable to generate a first signal in response to the passage of each document past a fixed point in the feeding path; timing means operable to generate a succession of timing signals in a predetermined relationship to a selected document timing; gating means responsive to the first signals and the timing signals to produce for each document a second signal in accordance with that one of a plurality of possible time increments in which the related first signal occurs; and a plurality of signal summing means, each responsive to second signals related to a different one of said time increments to generate third signals which represent a weighted average of the number of documents which had a timing in that time increment.

DESCRIPTION OF THE DRAWINGS

The invention will now be described, by way of example, with reference to the accompanying drawings, in which.

DESCRIPTION OF THE PREFERRED EMBODIMENT

Figure 1:
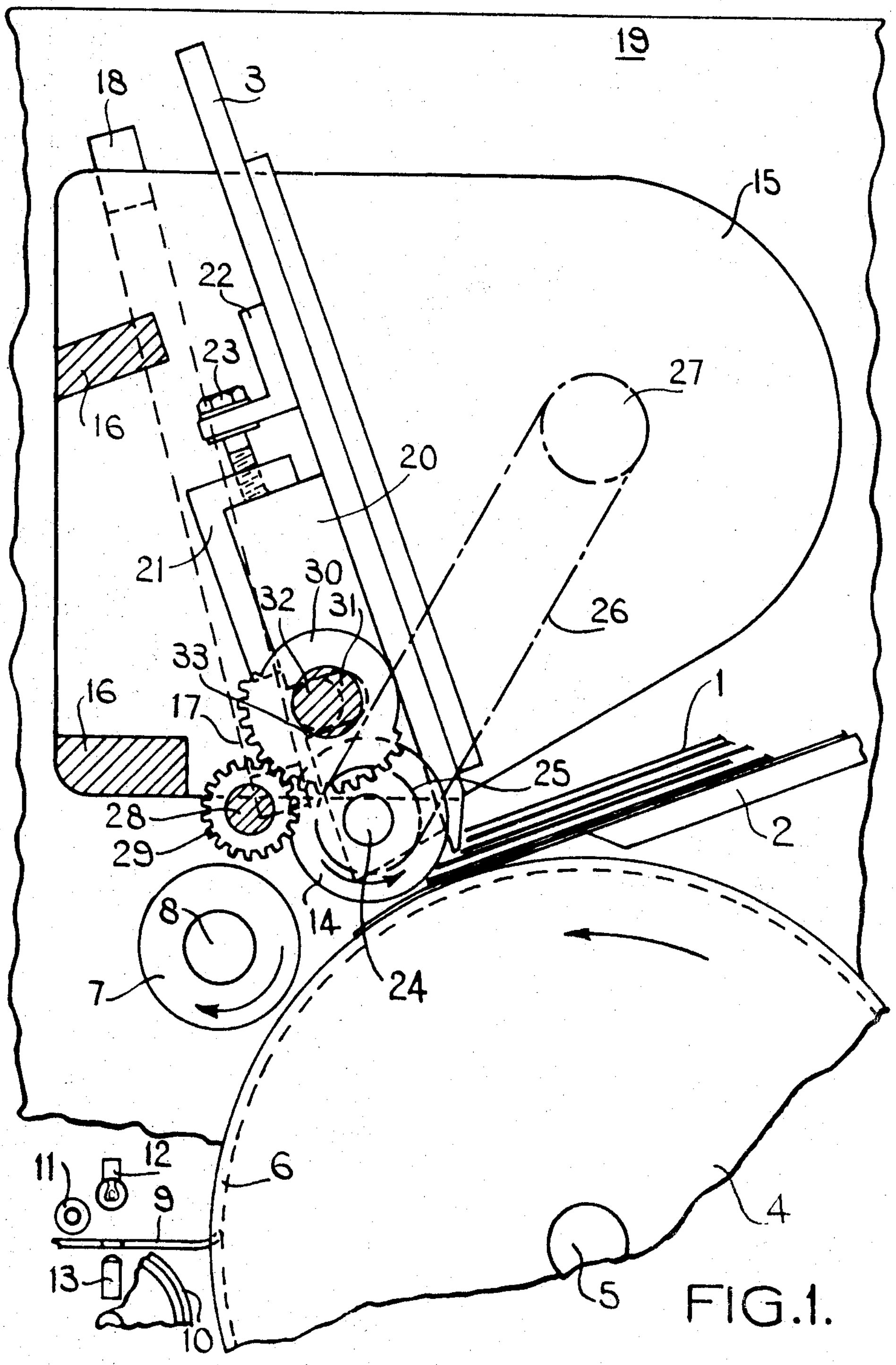
FIG. 1 is a schematic drawing of part of a document feeding device.

A stack of documents 1 (FIG. 1) which are to be fed are placed on a feed table 2, which is inclined at an acute angle to the horizontal. The documents may be, for example, bank checks on which data has been recorded previously by characters printed in magnetic ink in accordance with the so-called E 13 B coding system. The inclination of the feed table 2 tends to cause the stack of documents to move to the left, and downwards, as seen in FIG. 1, until one face of the stack is resting against a throat plate 3.

A vacuum feed drum 4 is mounted on, and continuously rotated by, a shaft 5. There are circumferential grooves 6 in the periphery of the drum 4. Holes in the surface of the drum 4 communicate with a vacuum system through control valves (not shown). Part of the surface of the drum 4 lies just below one bottom edge of the stack. When a document is to be fed, vacuum is applied to the holes by operation of the control valves and this holds the leading edge of the bottom document of the stack in contact with the drum. This document is withdrawn from the stack as the drum rotates. The withdrawal of the document is assisted by a feed roller 7, which engages the document after it has moved a short distance out of the stack. The roller 7 is driven by a shaft 8 so that the peripheral speed of the roller is the same as the peripheral speed of the drum 4.

As the drum continues to rotate, carrying the document with it, the leading edge of the document engages the ends of a pair of stripper bars 9. The leading edge of the document is pulled off the surface of the drum by the stripper bars and is guided to a position in which it is picked up by a conveyor belt feeder, indicated by belt 10 and feed roller 11. THe conveyor belt feeds the document away to whatever processing may be required. For example, the document may be fed through a reading station at which the magnetically recorded data is read and transferred to a computer, and on to a conventional document stacker.

A light source 12 and a photocell 13 are positioned on opposite sides of the document path adjacent to the roller 11. The leading edge of the document will intercept the light falling on the photocell just before the document is picked up by the conveyor belt feed. Consequently, the photocell will provide a signal indicative of the passage of the document past this point in the document feed path.

The lower end of the throat plate 3 is tapered to allow a few documents at the bottom of the stack to lie in echelon formation. This tapering of the throat plate, together with the action of separating rollers 14, ensure that the documents can be fed accurately, one at a time, by the feed drum 4. The position of the throat plate and the rollers 14 is adjustable so that the optimum feeding conditions can be secured over a wide range of document characteristics.

The throat plate and roller assembly is carried by a pair of plates 15, which are joined together by a pair of crossmembers 16. A block 17 is secured to the outside face of each of the plates 15. Each block 17 engages a groove 18 in side plates 19 of the document feed. Hence, the framework formed by the plates 15 and the members 16 is free to move in a direction substantially perpendicular to the surface of the drum 4.

A block 20 is secured to the inner face of each of the plates 15. The blocks 20 are bridged by an L-shaped member 21. A pair of brackets 22 are attached to the throat plate 3, and each bracket carries an adjustment screw 23 which engages with a threaded hole in the channel member 21. Hence, rotation of the screws 23 moves the throat plate relative to the blocks 20, and, therefore, relative to the framework.

The rollers 14 are mounted on a shaft 24, which is journaled in the blocks 20. The shaft 24 also carries a pulley 25. A belt 26 is driven by a pulley 27 and drives the pulley 25. The pulley 27 is driven through reduction gearing by an electric motor (not shown), which is mounted within the framework. The rollers 14 are so positioned that they are aligned with the grooves 6 of the drum 4 and the normal operating position is with the surface of each roller 14 approximately level with the surface of the drum 4, or even extending slightly into the groove. The roller is rotated in the opposite direction to the rotation of the drum 4, at a speed of approximately 1 revolution per minute. Correct positioning of the rollers 14, having regard to the thickness and stiffness of the documents, allows the bottom document in the stack to be fed by the drum 4, whilst the document immediately above the bottom document is retained in the stack by the rollers 14.

A stub shaft 28 is journaled in one of the side plates 19 and carries a pinion 29. The pinion 29 engages with a quadrant gear 30, which is secured to a further sub shaft 31, the shaft 31 carries an eccentrically mounted stud 32, which is engaged with a slot 33 in one of the blocks 20. Hence, rotation of the shaft 28 causes rotation of the shaft 31 and the eccentric movement of the stud 32 moves the framework formed by the plates 15, so that rotation of the shaft 28 adjusts the separation between the surface of the drum 4, and the rollers 14 and the lower end of the throat plate.

If the rollers 14 are in such a position that they are pressed deeply into the grooves 6 of the drum 4, they will act as a stop and prevent sheets being fed by the drum 4. As the rollers 14 are moved away from the surface of the drum, a position will be reached which just allows a sheet to be fed by the drum. However, the rollers will exert sufficient frictional force on the document to cause it to slip on the drum to an appreciable extent. As the rollers 14 are moved still further away from the drum, the frictional force which they exert on the document is reduced and the extent of the slip between the document and the drum is reduced. Finally, the separation between the rollers and the drum can be made so large that two documents may be fed at the same time.

The rotation of the drum can be used to establish a standard document timing. The moment at which the leading edge of a document intercepts the light falling on the photocell 13 provides an indication of the passage of the document along the feeding path. Any slip between the drum 4 and the document will cause the signal from the photocell 13 to be delayed relative to the standard timing. Hence, the amount of this signal delay is a measure of the amount of slip which is occurring. The amount of slip is controlled by the physical separation of the rollers and the drum, and by the thickness and other characteristics of the documents which are being fed.

A moderate amount of slip has been found to provide the optimum operating condition in which the most uniform feeding of documents is obtained. It is convenient to regard the time of arrival of the leading edge of a correctly fed document at the photocell 13 as being zero time. Hence, an increase in the separation between the rollers and the drum will tend to cause documents to arrive earlier than the zero time and a decrease in the separation will tend to cause the document to arrive later than the zero time. Minor differences in the characteristics of different documents will cause small variations in the timing, so that it is convenient to consider increments of time in determining timing errors.

Figure 2:
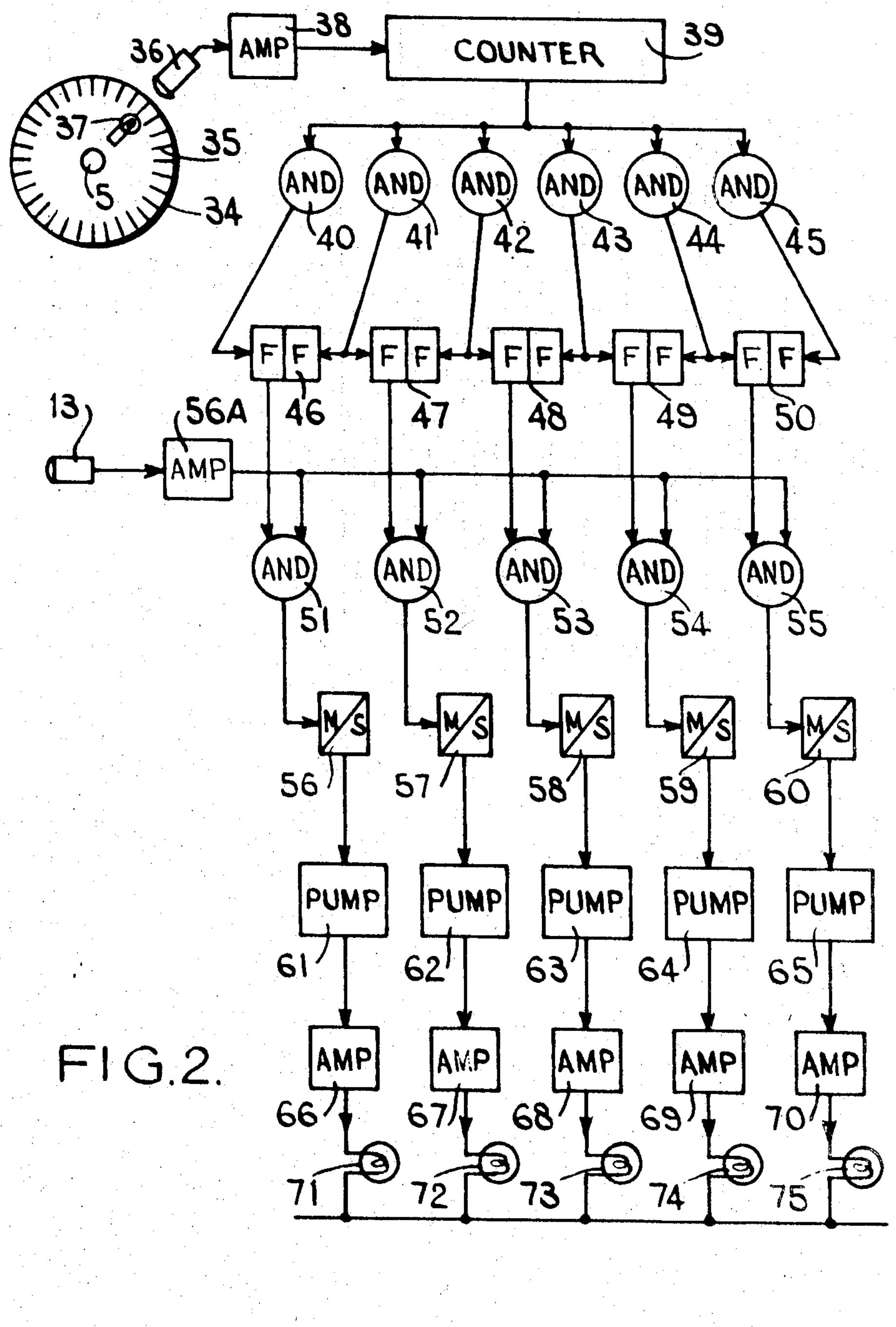
FIG. 2 is a schematic diagram of the control system utilized in one embodiment of the invention and FIG. 3 is a schematic diagram showing modifications to the control system of FIG. 2 which are utilized in a second embodiment of the invention.

Tests on a document handling mechanism, operating at a speed of about 300 documents per minute at a track speed of about 55 inches/sec., and using a feed generally similar to that already described, showed that a suitable set of timing error increments was as follows:

Zero error increment — 0 ±5 milliseconds
Early error increment 1— −5 to −15 milliseconds
Early error increment 2— −15 to −35 milliseconds
Late error increment 1— +5 to +15 milliseconds
Late error increment 2— +15 to +35 milliseconds A control system for providing an indication of the timing error is shown in FIG. 2. A timing disc 34 is secured to the shaft 5 which carries the feed drum 4. The timing disc is made of glass, or other transparent material. Opaque timing marks 35 are spaced around the periphery of the disc and they are sensed by a photocell 36 and a light source 37. The photocell 36 is connected to the input of an amplifier 38. The output of the amplifier provides a train of timing pulses which are synchronized with the rotation of the feed drum 4.

The timing pulses are applied to the input of a multistage counter 39. The stages of the counter are connected selectively to a group of six AND gates 40 to 45. The output signals from the AND gates are applied to five bistable triggers 46 to 50. The AND gate 40 is controlled by a combination of stages of the counter 39 such that the gate is operated when the counter receives the timing pulse which occurs at 35 milliseconds before zero time. The output from the AND gate 40 switches on the bistable trigger 46. The AND gate 41 is so connected to the mounter 39 that it is operated when the counter receives the timing pulse which occurs at 15 milliseconds before zero time. The output from the AND gate 41 resets the bistable trigger 46 and switches on the bistable trigger 47. Thus, the trigger 46 is switched on for the interval 35 to 15 milliseconds before zero time, corresponding to the duration of early error increment 2. The connections between the counter the AND gates and the triggers are so arranged that the triggers 47, 48, 49 and 50 are switched on for intervals corresponding to the duration of early error increment 1, zero error increment, late error increment 1 and late error increment 2, respectively.

The operation of the counter 39 has to be synchronized with the start of a document feeding cycle. If the vacuum is applied to the drum 4 at a predetermined point in the rotation of the drum, a reset signal for the counter 39 may be generated by a further timing mark on the disc 34 and an associated optical system (not shown). If the vacuum may be applied at any time, under control of a feed initiating signal, the counter is reset by a signal derived from this initiating signal. Thus, in either mode of operation, the counter starts from a zero count condition at the start of a document feeding cycle.

The triggers 46 to 50 apply signals to a group of five AND gates 51 to 55, respectively. The AND gates 51 to 55 also receive in common signals from the photocell 13, via an amplifier 56A. Each of these AND gates is operative if the associated trigger is on and a signal is received from the amplifier 56A. The amplifier 56A provides an output pulse of approximately 10 microseconds duration each time the leading edge of a document passes the photocell 13.

The gates 51 to 55 apply signals to a group of five monostable triggers, 56 to 60, respectively. The trigger 58, which receives signals indicating zero error, has a relaxation time of 26 milliseconds, and the other triggers of the group have a relaxation time of 53 milliseconds. The output pulses of the triggers 56 to 60 are applied to diode pump circuits 61 to 65, respectively. Various forms of pump circuit are well known and one example of this circuit is described in detail in British Patent Specification No. 855,088. Essentially, a pump circuit provides a storage capacitor so arranged that it is charged by input pulses applied to the circuit and discharges at a predetermined rate between pulses. In the present case, the discharge rate is chosen to give a time constant for the pump circuit of approximately 10 seconds. The amplitude and duration of the pulses generated by each monostable trigger are constant, and the time constant of the pump circuit is large in relation to the pulse duration. Hence, the voltage to which the storage capacitor is charged at any given time represents an average of the number of pulses which have occurred in a preceding interval of time.

The output voltages of the pump circuits 61 to 65 are applied to DC amplifiers 66 to 70 respectively, which drive indicator lamps 71 to 75, respectively.

As an example of the operation of the system, it will be assumed the leading edge of a document reaches the photocell at +13 milliseconds, that is, 13 milliseconds later than the zero time. This causes a signal to be applied to the AND gates 51 to 55 at this time. At +5 milliseconds, the counter 39 operated the AND 43, which produced a signal to reset the trigger 48 and to switch on the trigger 49. Hence, AND gate 54 is still enabled at +13 milliseconds, and the signal from the photocell 13 will pass this gate to switch on the monostable trigger 59. The trigger 59 applies a pulse of 53 milliseconds duration to the pump circuit 64. This pulse increases the charge on the storage capacitor of this pump circuit, the voltage across the capacitor increases, and the voltage applied to the indicator lamp 74 by the amplifier 69 increases. If the timing of the next document is such that the signal from the photocell 13 occurs at +2 milliseconds, the voltage applied to the indicator lamp 73 will be increased by operation of the chain of circuits starting with AND gate 53, and similarly for other document timings.

It has been found that the timings of the documents fall in a narrow range centered on the zero time, if the feeding mechanism is properly adjusted. The timings fall in a wider range which may not be symmetrical with respect to zero time, if the feeding mechanism is not properly adjusted. However, even with an incorrect adjustment, a large proportion of the documents have timings within the zero error increment. Accordingly, the sensitivity of the system to mistiming is increased by giving greater weight to signals indicating mistiming. This is achieved by a combination of two factors. Firstly, the duration of the pulse applied to the pump circuit 63, for the zero error increment, is half the duration of the pulses applied to the other pump circuits. Secondly, the duration of the zero increment itself is half the duration of increment 1, which is half the duration of increment 2. Hence, if the distribution of document timings were uniform over the whole range, the change in output of the pump circuits 61 and 65 would be approximately eight times the change in the output of the pump circuit 63, when a batch of documents was fed through.

The weighting may be changed to take account of particular error distribution by altering the duration of the error increments and/or the duration or amplitude of the pulses applied to the pump circuits, and/or the time constants of the pump circuits. The weighting may also be effected wholly, or in part, by arranging that the amplifier 66, for example, has a greater gain than the amplifier 68. The operating characteristics of the individual lamps 71 to 75 may be different to provide further control of the weighting. The weighting may be asymmetric, that is, early errors may be given greater significance than late errors, or vice versa.

All the timings will fall in the zero error increment under ideal feeding conditions. The pump circuit 63 will be producing a large output signal and the other pump circuits will be producing no output. Consequently, the lamp 73 will be lit brightly, and the remaining lamps will be unlit. The procedure for adjusting the feed to handle documents having a particular set of characteristics is that, while a sample batch of the documents is being fed, the shaft 28 is rotated slowly to a position in which the lamp 73 is lit most brightly. The manner in which rotation of the shaft 28 controls the position of the rollers 14 and the resultant timing of the documents has been explained earlier in detail. Thus, when the lamp 73 is lit most brightly, the timing of the maximum number of documents is falling within the duration of the zero error increment and the feed has been adjusted optimally for the documents in the sample batch. The adjustment is carried out under operational conditions and does not require the use of measuring instruments, so that it can be performed readily by an operator whenever a new batch of documents has characteristics different from those of the documents which have been handled previously.

If the characteristics of the individual documents forming a batch vary over a substantial range, it may be that an optimum adjustment for all the documents cannot be obtained. The timing of a proportion of the documents will fall outside the duration of the zero error increment, and one, or more, of the lamps, in addition to the lamp 73, will be lit to some extent. The acceptable tolerance in the timing of the documents is dependent upon the particular characteristics of the sensing device, or other apparatus, to which the documents are being fed. The operator rapidly learns what level of brightness of the various indicator lamps corresponds to acceptable operation for a particular system. If the feed has been adjusted to the best position and the required brightness pattern is not obtained, the display acts as a warning to the operator that the variation of characteristics of the documents in the batch is too great for reliable operation of the system.

Figure 3:
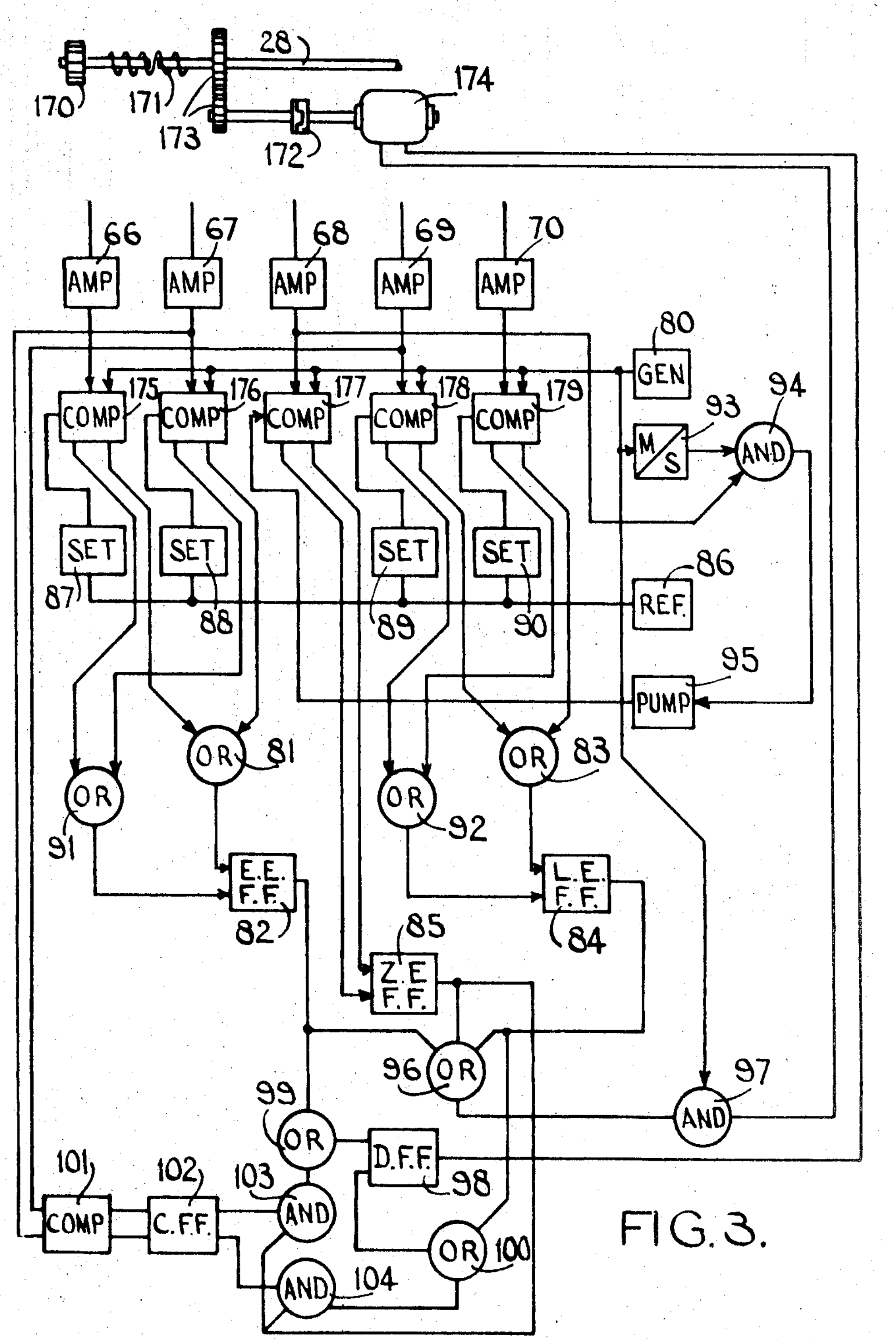

The embodiment of the invention which has been described provides a visual display which enables the machine operator to adjust the feed manually for optimum operation. Automatic adjustment of the feed may be desired under some conditions. This can be achieved by a servosystem which operates the feed adjustment under control of the signals provided by the amplifiers 66 to 70, which signals indicate the distribution of the document timings within the different time increments. One form of servosystem which may be used is shown in diagrammatic form in FIG. 3. A manual adjustment knob 170 is connected to the shaft 28 through a helical spring clutch 171. The shaft 28 is also connected through a friction clutch 172 and gearing 173 to the drive shaft of an electrically operated bidirectional stepping motor 174, so that the shaft 28 may be rotated by means of either the manual adjustment knob 170 or the stepping motor 174. The pulses for operating the stepping motor are generated by a logical control circuit.

The logical control circuit includes voltage comparison circuits 175 to 179 which are operated by the signals of the amplifiers 66 to 70, respectively. The voltage comparison circuits are also controlled by a sampling signal which occurs at, say, intervals of 10 seconds and is provided by a timing signal generator 80. The sampling signal enables each voltage comparison circuit to compare the output voltage of each amplifier with a reference voltage. The comparison circuit provides a pulse output which indicates whether the output of the amplifier is greater than, or not greater than, the reference voltage. The outputs indicating a greater than condition from the voltage comparison circuits 175 and 176 for the amplifiers 66 and 67 are fed through an OR gate 81 to an early error trigger 82, so that the trigger is switched on if either of the comparison outputs indicates a greater than condition. A late error trigger 84 is controlled in the same way by the comparison outputs from circuits 178 and 179, via an OR gate 83. The comparison outputs from the circuit 177 are fed directly to a zero error trigger 85, so that the trigger is switched on for a not greater than condition and is switched off for a greater than condition. The triggers 82 and 84 are switched off by the not greater than outputs from the comparison circuits through OR gates 91 and 92.

The reference voltages for the comparison circuits 175, 176, 178 and 179 are derived from a fixed voltage reference source 86 via presettable resistor networks 87, 88, 89 and 90, respectively. It has been noted earlier that the allowable tolerance on timing of the documents is a function of the overall system characteristics. The reference voltages are preset to values such that the early and/or the late error triggers will be switched on at an error level which is within the allowable tolerance.

The reference voltage for the comparison circuit 177 is provided in the following manner. The trailing edge of the sampling pulse is used to switch on a monostable trigger 93, which opens an AND gate 94 to allow the voltage output from the amplifier 68 to be fed to a pump circuit 95 for a predetermined time. The time constant of the pump circuit 95 is such that the output voltage of the pump circuit, which is used as the reference voltage, has decreased by a small amount in the interval between the application of an input to the circuit and the occurrence of the next sampling pulse. Consequently, if the system is in a steady state in which the number of documents having timings within the zero error increment is constant, the voltage comparison circuit 177 will produce a greater than indication each time a sampling pulse occurs.

The outputs from the three error triggers are connected through an OR gate 96 and to an AND gate 97 which is the stepping motor drive control. If one, or more, of the triggers are on, the AND gate will allow an operating pulse to be applied to the stepper motor 174 each time a sampling pulse occurs. The operating pulse will cause an incremental movement of the drive shaft of the motor, which will rotate the shaft 28 by a small amount.

The direction of rotation of the stepper motor is determined by a directional trigger 98, which causes the operating pulses to be applied to the stepper motor 174 in such a way that the motor is driven in one direction, or the other direction, in accordance with the on, or off, state of the trigger. The directional trigger 98 is set on by a pulse through OR gate 99 due to the early error trigger 82 switching on, and the stepper motor will then be driven to rotate the shaft 28 to move the rollers 14 closer to the drum. The directional trigger 98 is set off by a pulse through OR gate 100 due to the late error trigger 84 switching on, and the stepper motor will then drive to move the rollers 14 away from the drum.

The outputs from the amplifiers 67 and 69 are applied to a further voltage comparison circuit 101, the output from which is fed to a control trigger 102 to set it on, or off, according to whether the voltage from the amplifier 67 is greater than the voltage from the amplifier 69, or vice versa. The trigger 102 controls a pair of AND gates 103 and 104 which also receive a signal from the zero error trigger 85 when it switches from off to on. These AND gates 103 and 104 are connected to the directional trigger 98 via OR gates 99 and 100 so that it is set on, or off, if the trigger 102 is on, or off, respectively, when the zero error trigger switches.

The logical control circuit and the stepping motor operate as a two-level servo control for setting the position of the rollers 14. The operation of the servocontrol will be explained by considering a particular operating sequence. The operator sets the rollers 14, by means of the manual adjustment knob 170 on the shaft 28, before document feeding commences. The rollers 14 are set to a position which the operator expects from experience will be suitable for the particular batch of documents which are to be fed. The knob may be provided with a pointer cooperating with a calibrated dial to assist the operator in the initial positioning of the rollers.

It will be assumed, by way of example, that the operator has mistakenly set the rollers 14 too far away from the drum by an appreciable amount. Accordingly, when the documents are fed, the number of documents which have a timing which falls in the early error increment 1 may exceed the allowable maximum. This maximum is represented by the value of the preset reference voltage which is applied to the voltage comparison circuit 176. The first sampling signal will be passed by the voltage comparison circuit 176 to switch on the early error trigger 82. The output of this trigger will enable the AND gate 97 which controls the application of operating pulses to the stepper motor 174. The switching on of the early error trigger will switch on the directional trigger 98, so that the motor will drive the rollers 14 towards the drum in response to the operating pulses. The step by step adjustment of the rollers will gradually reduce the number of documents with incorrect timing, until the number falls within the tolerance. The output from the amplifier 67 will fall below the level of the reference voltage and the next sampling pulse will switch off the early error trigger 82. The AND gate 97 will be disabled and the motor will stop.

The documents should be fed satisfactorily after the feed has been adjusted by the servocontrol. However, there may be relatively slow changes in the operating conditions. For example, a reduction in the main power supply to the equipment may produce a gradual reduction in the vacuum applied to the feed drum. This could cause an increase in timing errors which would eventually become sufficiently numerous to switch on again the early error trigger and initiate a further cycle of adjustment. However, adjustment under these conditions may be initiated by the zero error trigger 85, before the errors are sufficiently numerous to operate the early error trigger.

It has already been explained that the reference voltage used for comparison with the output of the amplifier 68 is an averaged value of the previous output voltage of the amplifier. Hence, if the operating conditions change in such a way that there is a decrease in the number of the documents with timings in the zero error increment in successive sampling intervals, the output from the amplifier 68 will be decreasing. If the rate of decrease is appreciable, the output voltage of the amplifier 68 will be less than the reference voltage, the zero error trigger will be switched on, and the AND gate 97 controlling the supply of operating pulses to the motor will be enabled. The directional trigger will be set in the manner already explained, to ensure that the motor is driven in the correct direction. Thus, the motor will be driven until the feed is readjusted to a stable condition in which the number of documents with zero error timing is no longer decreasing, and the zero error trigger is therefore switched off.

The control exercised by the zero error trigger is also effective in another condition. If the initial manual adjustment of the feed was considerably in error, the number of both early and late timing errors may be sufficient to cause operation of both the early and late error triggers. The setting of the directional trigger is indeterminate under these conditions, depending upon the relative timing of the switching of the early and late error triggers. If the directional trigger has been set incorrectly, the number of correctly timed documents will decrease as the feed is adjusted by the servo. This will cause the zero error trigger to be switched on and the directional trigger will then be set correctly under control of the comparison circuit 101.

The invention has been described as applied to a particular form of document feeding mechanism. However, it can be used equally well with other forms of feeding mechanism which have provision for adjusting the relative timing of the documents.

It will be appreciated that the particular circuits which have been described in connection with the indicator and control circuits are exemplary, and other functionally equivalent circuits may be employed.

We claim:

1. Document feeding apparatus including means operative to feed a succession of documents one by one along a feeding path; sensing means operable to generate a first signal in response to the passage of each document past a fixed point in the feeding path; timing means having a plurality of timing signal output lines and being operative to generate a single timing signal on each of said output lines for each passage of a document past the sensing means, each such timing signal occurring during a different predetermined time interval relative to a selected document timing; gating means having gating output lines corresponding to said timing signal output lines and responsive to said first signal and said timing signals to generate for each document a single pulse of predetermined duration on one of the gating output lines determined by the timing coincidence of the first signal with one of the timing signals; pulse integrating means, one connected to each of the gating output lines and responsive to the pulses thereon to generate an output signal the magnitude of which is representative of the number of pulses received by the integrating means over a predetermined time period; and visual indicating means one connected to each integrating means and responsive to the output signal therefrom to provide an indication dependent on the magnitude of said output signal.

2. Document feeding apparatus as set forth in claim 1 in which one of said gating means generates pulses of half the duration of the pulses generated by the remainder of the gating means.

3. Document feeding apparatus as set forth in claim 1, having means for generating a train of pulses in synchronism with the cycle of operation of the document feeding means; a pulse counter responsive to said train of pulses; a plurality of gates controlled by the counter and operative to produce output pulses at selected times within the said cycle; and a plurality of two state devices, each responsive to a pair of said output pulses, such that a different one of the devices is in a predetermined state for the duration of each of said different time increments.

4. Document feeding apparatus as set forth in claim 3, having a plurality of AND gates, each responsive to said first signals and to state representing signals of one of said two state devices to generate an output signal for each of said first signals which occurs in a particular time increment.

5. Document feeding apparatus as set forth in claim 4, having a plurality of monostable devices, each responsive to output signals from one of said AND gates to apply pulses of predetermined amplitude and duration to a pulse integrating circuit.

6. Document feeding apparatus as set forth in claim 1, having reference voltage sources; voltage comparison devices operable to compare the output signals with said reference voltages; and two state devices settable in accordance with the result of the comparisons at predetermined sampling times.

7. Document feeding apparatus as set forth in claim 6, having a logical gating circuit interconnecting the said two state devices and said driving means, and so arranged that the driving means may be controlled by one of said two state devices, and by one of said two state devices in conjunction with at least one other of said two state devices.

8. Document feeding apparatus as set forth in claim 7, having a constantly rotating vacuum drum operable to feed the documents one by one from a stack of documents; a contrarotating separator roller positioned adjacent to the surface of said drum; and means operable to adjust the spacing between the separator roller and the surface of the drum.

9. Document feeding apparatus as set forth in claim 1, having means for supporting a stack of documents; a rotatable drum positioned adjacent a face of the stack; selectively operable means for applying vacuum to the drum to cause it to extract a document from the stack; and a separator roller positioned adjacent to the drum to engage a document extracted from the stack; and means for rotating the roller in a direction which tends to move such document back into the stack.

10. Document feeding apparatus including means operative to feed a succession of documents one by one along a feeding path; feed adjustment means operable to control the feeding of the documents to vary the timing thereof; sensing means operable to generate a first signal in response to the passage of each document past a fixed point in the feeding path; timing means having a plurality of timing signal output lines and being operative to generate a single timing signal on each of the said output lines for each passage of a document past the sensing means, each such timing signal occurring during a different predetermined time interval relative to a selected document timing; gating means having gating output lines corresponding to said timing signal output lines and responsive to said first signal and said timing signals to generate for each document a single pulse of predetermined duration on one of the gating output lines determined by the timing coincidence of the first signal with one of the timing signals; pulse integrating means, one connected to each of the gating output lines and responsive to the pulses thereon to generate an output signal the magnitude of which is representative of the number of pulses received by the integrating means over a predetermined time period; driving means operatively coupled to said feed adjusting means; and means controlled by the output signals of the integrating means and effective to energize the driving means to operate the adjusting means to provide a desired document timing.

11. Document feeding apparatus as set forth in claim 10, having means for generating a train of pulses in synchronism with the cycle of operation of the document feeding means; a pulse counter responsive to said train of pulses; a plurality of gates controlled by the counter and operative to produce output pulses at selected times within the said cycle; and a plurality of two state devices, each responsive to a pair of said output pulses such that a different one of the devices is in a predetermined state for the duration of each of said different time increments.

12. Document feeding apparatus as set forth in claim 11, having a plurality of AND gates, each responsive to said first signals and to state representing signals of one of said two state devices to generate an output signal for each of said first signals which occurs in a particular time increment.

13. Document feeding apparatus as set forth in claim 12, having a plurality of monostable devices, each responsive to output signals from one of said AND gates to apply pulses of predetermined amplitude and duration to a pulse integrating circuit.

14. Document feeding apparatus as set forth in claim 10, having reference voltage sources; voltage comparison devices operable to compare the output signals with said reference voltages; and two state devices settable in accordance with the result of comparisons at predetermined sampling times.

15. Document feeding apparatus as set forth in claim 14, having a logical gating circuit interconnecting the said two state devices and said driving means, and so arranged that the driving means may be controlled by one of said two state devices, and by one of said two state devices in conjunction with at least one other of said two state devices.

16. Document feeding apparatus as set forth in claim 15, having a constantly rotating vacuum drum operable to feed the documents one by one from a stack of documents; a contrarotating separator roller positioned adjacent to the surface of said drum; and means operable to adjust the spacing between the separator roller and the surface of the drum.

17. Document feeding apparatus as set forth in claim 10, having means for supporting a stack of documents; a rotatable drum positioned adjacent a face of the stack; selectively operable means for applying vacuum to the drum to cause it to extract a document from the stack; and a separator roller positioned adjacent to the drum to engage a document extracted from the stack; and means for rotating the roller in a direction which tends to move such document back into the stack.